United States Patent [19]

Armistead

[11] 4,075,024
[45] Feb. 21, 1978

[54] COLORED GLASSES AND METHOD

[75] Inventor: William H. Armistead, Corning, N.Y.

[73] Assignee: Corning Glass Works, Corning, N.Y.

[21] Appl. No.: 715,989

[22] Filed: Aug. 19, 1976

[51] Int. Cl.$^2$ ............................ C03C 3/10; C03C 3/08
[52] U.S. Cl. ........................................ 106/53; 106/54; 65/117
[58] Field of Search ..................................... 106/54, 53

[56] References Cited
U.S. PATENT DOCUMENTS 2,106,744   2/1938   Hood et al. ............................ 106/54

OTHER PUBLICATIONS

Weyl, W. A., Coloured Glasses, Society of Glass Technology, England 1951, pp. 406–407.

Primary Examiner—Patrick P. Garvin
Assistant Examiner—Mark Bell
Attorney, Agent, or Firm—Kees van der Sterre; Clinton S. Janes, Jr.; Clarence R. Patty, Jr.

[57] ABSTRACT

A colored glass article composed of a phase-separated borosilicate glass comprising a separated, glassy boron-rich phase having, in association therewith, a coloring metallic silver phase imparting a broad range of absorption colors thereto is provided by heat-treating a specified phase-separated borosilicate glass containing silver and a weak thermal reducing agent such as antimony at a temperature above the annealing point.

4 Claims, 1 Drawing Figure

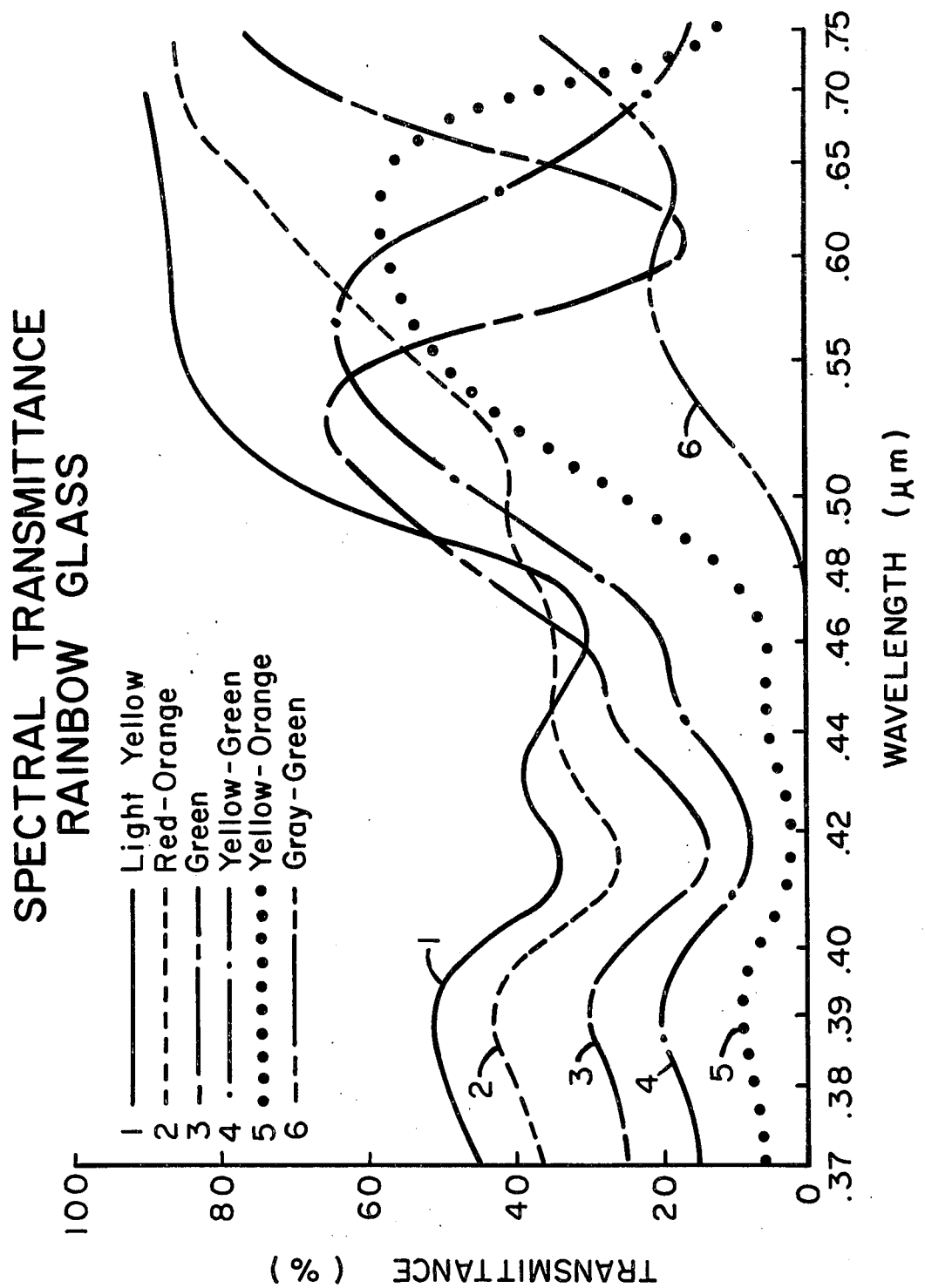

COLORED GLASSES AND METHOD

BACKGROUND OF THE INVENTION

Silver is a well-known agent for imparting a yellow or brown color to glasses. The coloring effect of silver in glass is attributed to the absorption behavior of metallic silver aggregates of colloidal size. These may be precipitated by heat treatment of glasses containing dissolved silver, or introduced into the glass surface by ion-exchange processes at elevated temperatures utilizing so-called silver staining techniques. A comprehensive discussion of the use of silver as a glass coloring agent is provided by W. A. Weyl in *Coloured Glasses*, Dawson's of Pall Mall, London (1959).

Methods for utilizing silver to provide colors other than yellow or brown in certain glasses are also known. Thus Forst et al. describe, in "Red Silver Glasses", J. Am. Cer. Soc., 25, 10, pages 278–280 (1942), the use of silver to produce yellow, orange, red and purple colors in certain lead silicate glasses containing an immiscible halide phase. The disadvantages of this system include the need for large additions of silver halides, the tendency toward opalization on reheating exhibited by some of the glasses, and the fact that only a limited range of colors (no blue or green) may by produced therein.

The phase-separation behavior which occurs in the alkali borosilicate glass composition system is documented by Hood et al. in U.S. Pat. No. 2,106,744. Hood et al. found that many such glasses separate during forming or upon reheating into a major silica-rich phase and a minor boron-rich phase.

The distinct nature of the boron-rich phase is shown by the fact that it can be removed from the silica-rich phase in certain of these glasses by suitable chemical treatments. The primary application for these phase-separable borosilicates has been in the manufacture of highly refractory glass products known as 96% silica glasses.

SUMMARY OF THE INVENTION

I have now discovered that a very broad range of coloration can be developed by heat treatment in certain phase-separated borosilicate glasses containing dissolved silver and a weak reducing agent such as antimony oxide. The glass products produced by this method are transparent to slightly opalescent, and the colors observed are absorption colors which I attribute to the formation, on reheating, of a metallic silver phase in association or combination with the separated, glassy, boron-rich phase also present in the glass. A full range of colors, including yellow, orange, red, purple, blue, green, brown, and mixtures thereof, have been observed.

Good coloring effects require that the base glass exhibit a specified phase-separation behavior. Suitable glasses in this respect are phase-separable borosilicate glasses comprising specified additions of one or more bivalent metal oxides selected from the group consisting of PbO, ZnO and BaO. Representative of glass compositions which may be heat-treated to provide strong silver coloration are those consisting essentially, in weight percent as calculated from the batch, of about 5–21% $B_2O_3$, 35–75% $SiO_2$, 5–50% total of bivalent metal oxides selected in amounts not exceeding the indicated proportions from the group consisting of up to 50% PbO, 15% ZnO and 5% BaO, 0.5–1.5% of silver compounds, 1–4% $Sb_2O_3$, 0–9% $Na_2O$, 0–2% F and 0–1% $P_2O_5$.

Glasses of the described composition, when melted in accordance with conventional practice, yield clear or slightly opalescent water-white or pale yellow to brown products after pressing and a normal annealing treatment. The warming-in of the desired absorption color generally requires further heating at a temperature above the annealing point of the glass in order to precipitate metallic silver particles in or near the interface between the separated boron-rich phase and the silica-rich matrix glass.

Many of the recited base glass compositions exhibit the important property of undergoing substantial phase separation during cooling as the glass is formed from the melt. In such cases only brief heating is required to develop a coloring metallic silver phase in association with the separated glassy boron-rich phase already present in the glass. However, color can also be induced in glasses exhibiting less favorable phase-separation characteristics, since some glassy phase development can be obtained by prior heat treatment, or produced simultaneously with silver phase development during the required warming-in heat treatment.

The broad range of colors produced during the warming-in heat treatment of these glasses is attributed to the formation of silver color centers in or near the separated boron-rich phase in the glass, most probably at the interface between the two glassy phases present. The color observed is thought to depend on the size of the silver color centers, which in turn strongly depends upon the time and temperature of the warming-in heat treatment.

The temperature dependence of the process is shown by the fact that a temperature increase of 10°–15° C. will usually double the rate of warming-in. Thus, it is found that a small temperature gradient across the glass article during heat treatment can produce a "rainbow" effect whereby the full range of coloration, including a sequence of colors, is formed in a single piece of glass.

DESCRIPTION OF THE DRAWING

The Drawing consists of a series of curves plotting transmittance versus wavelength for six selected regions of a colored glass article provided by heat treatment of a phase-separated borosilicate glass article in accordance with the invention. The article was heated in a gradient furnace to develop a sequence of colors therein as hereinafter described. The different absorption colors associated with each of the six different transmittance curves are noted.

DETAILED DESCRIPTION

The color changes observed during heat treatment of the glass are attributed to the continuous shift from shorter toward longer wavelengths of an absorption band imparted to the glass by precipitated metallic silver. Factors affecting the observed color include the concentration and configuration of the metallic color centers in the glass and the optical properties of the matrix glass and the separated boron-rich glassy phase.

The purest colors may be obtained in base glass compositions which exhibit substantial phase separation as the glass melt is cooled during forming into a glass article, yet which resist further phase separation during the warming-in heat treatment. Compositions which require a phase-separating heat treatment prior to warming-in, or which exhibit additional phase separation during color development, exhibit colors of lower purity. This is because color centers formed in the early stages of heating reach an advanced stage of development while color centers formed in association with regions of newly formed boron-rich glass exhibit colors characteristic of less advanced growth. Thus, broader, less selective light absorption is often provided in glasses requiring supplemental heating for phase separation.

In some cases broad absorption in the visible region is desirable, as for example, where a glass exhibiting good infrared transmittance but high optical density throughout the visible and ultraviolet regions is required. The effects of phase separation on color may also be utilized to provide gradients in coloration and color intensity, by employing chill effects and thickness variations in formed glassware to control the extent of color development in selected regions of the glass.

Certain common glass constituents adversely affect the phase separation behavior of borosilicate glasses and should be excluded from the composition. $Al_2O_3$ is an example of a component which stabilizes borosilicate glasses against phase separation and thus inhibits the development of color.

$Li_2O$ and $K_2O$ may be added or substituted for $Na_2O$ in small amounts, but these oxides modify the viscosity and phase separation characteristics of the glass and should be used with discretion. Other bivalent metal oxides such as CdO, MnO, BeO, MgO, CaO, and SrO may be present in minor quantities provided that they do not deleteriously affect the phase-separating characteristics of the glass.

In addition to its effect on phase-separation behavior, composition plays an important role in the subsequent development of color in these borosilicate glasses. Of principal importance is the effect of composition on the threshold silver concentration, which is that concentration of silver just required to produce pale color in the phase-separated glass during the warming-in heat treatment.

A useful method for describing the effects of various composition constituents on threshold silver concentration is to report the changes in threshold level which result from changes in concentration of the other composition constituents. Table I below lists some general trends in threshold silver level which have been observed upon increasing the concentrations of some of the other composition constituents present in the glass.

TABLE I

| Increasing | Threshold Silver Concentration |
|---|---|
| $Na_2O$ | Increasing rapidly |
| $B_2O_3$ | Increasing |
| Bivalent Metal Oxides | Increasing rapidly |
| $Sb_2O_3$ | Decreasing, then increasing rapidly |
| F | Decreasing |
| $P_2O_5$ | Decreasing |

The described threshold effects, particularly in the case of antimony oxide and the bivalent metal oxides, are presently believed to fulfill an important function in promoting silver precipitation at the interface between the boron-rich and silica-rich phases present in the glass, rather than within either of these separated phases.

The presence of a weak reducing agent such as antimony oxide is required to reduce ionic silver to silver metal during the warming-in heat treatment. The oxidation-reduction reaction between silver and antimony is temperature dependent, favoring the formation of silver ions at high temperatures and silver metal at low temperatures, as shown below:

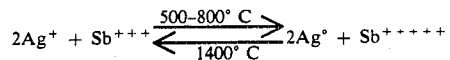

Thus antimony promotes the ionization and solution of silver during the melting of the glass, but acts as a silver precipitating agent during the warming-in heat treatment.

In addition to its essential effect upon the behavior of silver in the glass, $Sb_2O_3$ offers further advantages in that it has no visible light absorption bands and exerts practically no effect upon borate phase separation in concentrations up to about 4%. However, other weak reducing agents such as arsenic, tin, iron and uranium oxides could be substituted for antimony oxide, if desired.

Fluorine and $P_2O_5$ are optional constituents which, in small quantities, can intensify the color developed in the glass during the warming-in heat treatment. These agents may serve to promote phase-separation during the working of the glass, increasing the availability of sites for subsequent silver precipitation. However, excessive concentrations of these ingredients can cause opalization of the glass.

It is well known in the glass art that the means by which silver is introduced into glass is important, and that introduction can be facilitated using silver compounds which resist decomposition until batch fusion temperatures are reached. Silver chloride, silver borate and silver phosphate are examples of such compounds, with silver chloride being particularly preferred. However, other silver compounds useful for introducing silver into glass may alternatively be employed.

Specific examples of glass compositions which may be formed into phase-separated borosilicate glass articles suitable for use in the invention are set forth in Table II below. The compositions are reported in parts by weight on the oxide basis, except for fluorine, $P_2O_5$ and silver which are reported in parts by weight of the compounds actually used in the batch. Table II also reports the appearance of annealed glass slabs formed by casting from melts of the compositions shown, and a suitable temperature for warming-in the silver color for each of the cast phase-separated glass articles thus provided.

TABLE II

| | | | | | | | | | |
|---|---|---|---|---|---|---|---|---|---|
| $SiO_2$ | 65 | 66 | 56 | 65 | 65 | 75 | 37.5 | 67 | 65 |
| $B_2O_3$ | 17 | 20 | 13 | 17 | 20 | 5 | 10 | 10 | 15 |
| $Na_2O$ | 8 | 8 | 5 | 8 | 8 | 7.5 | — | 6 | 6 |
| $Sb_2O_3$ | 2 | 2.5 | 2 | 2 | 2 | 2.5 | 2.5 | 2 | 2 |
| AgCl | 0.85 | 0.70 | 0.85 | 1.0 | 0.6 | 0.8 | 0.8 | 1.5 | 1.0 |
| ZnO | 5 | — | — | 5 | — | 10 | — | 15 | 9 |
| PbO | — | — | 24 | — | 5 | — | 50 | — | 3 |
| BaO | — | 5 | — | — | — | — | — | — | — |
| $Na_2SiF_6$ | 3 | | 3 | 3 | 3 | | | | 3 |
| $Na_2P_2O_7$ | | | | | | | | | |

TABLE II-continued

| | | | | | | | | | |
|---|---|---|---|---|---|---|---|---|---|
| As$_2$O$_3$ | | | | | | | | | |
| MnO$_2$ | | | | | | | | | |
| Appearance as Cast (Annealed) | Clear | Clear | Clear; Yellow Streaks | Clear | Clear | Clear | Clear Brown | Very Pale Opal | Clear |
| Warming-in Temperature (° C.) | 575 | 625 | 600 | 575 | 575 | 625 | 600 | 600 | 600 |

| | | | | | | | | |
|---|---|---|---|---|---|---|---|---|
| SiO$_2$ | 67 | 67 | 67 | 67 | 67 | 65 | 67 | 66 |
| B$_2$O$_3$ | 21 | 21 | 20 | 20 | 20 | 15 | 20 | 20 |
| Na$_2$O | 5 | 5 | 5 | 5 | 5 | 6 | 5 | 5 |
| Sb$_2$O$_3$ | 2 | 2 | 2 | 2 | 2 | 2 | 3 | 4 |
| AgCl | 0.5 | 0.7 | 0.7 | 0.7 | 0.8 | 0.6 | 0.8 | 0.9 |
| ZnO | 5 | 5 | 5 | 5 | 5 | — | 5 | 5 |
| PbO | — | — | — | — | — | 12 | — | — |
| BaO | — | — | — | — | — | — | — | — |
| Na$_2$SiF$_6$ | | | | | | | | |
| Na$_2$P$_2$O$_7$ | | 1 | | | | | | |
| As$_2$O$_3$ | | | 0.5 | 1.0 | | | | |
| MnO$_2$ | | | | | 1 | | | |
| Appearance as Cast (Annealed) | Pale Opal | Very Pale Opal | Clear | Clear | Pale Amber | Yellow | Clear | Clear |
| Warming-in Temperature (° C.) | 550 | 565 | 550 | 550 | 540 | 600 | 600 | 560 |

The colors which are developed in phase-separated glasses such as described in Table II, when heat treated at a selected warming-in temperature such as reported, depend wholly upon the time of treatment. At a given temperature, a yellow color is normally the first color to appear, but this color will quickly change to orange, red, purple, blue, green, again to yellow and then to brown if the glass is maintained at a temperature where further silver precipitation can occur.

The rate of color development and change is increasingly rapid as the glass is heated to higher temperatures, but higher temperatures also favor further phase separation and result in some blurring and mixing of colors. The best control over color and the rate of color development is therefore exercised by heating at a temperature ranging from about the annealing point to about 75° C. above the annealing point of the glass.

The purest colors are obtained in glasses wherein PbO and/or ZnO are the bivalent metal oxides, although blue and purple colors are observed with lesser frequency and intensity in glasses containing only PbO. These oxides are preferred because they appear to provide glasses which exhibit good phase separation during working, but which do not further phase separate and opalize at temperatures such as utilized for the warming-in of the silver color. In contrast, glasses comprising excessive quantities of CdO or MnO tend to opalize comparatively easily during heat treatment.

In general, the intensity of color in the glass can be increased either by increasing the extent of phase separation or by adding additional silver to the composition. As an illustration of the former effect, if one of two identical glass articles is given a long supplemental heat treatment at a low temperature to enhance phase separation prior to warming-in, it will exhibit a more intense coloration than the untreated glass if both are thereafter heat treated to develop color.

The use of silver in the threshold concentration for a particular composition typically provides pale coloration even with optimum heat treatment. However, the incorporation of a small amount of additional silver (e.g., 0.1% AgCl) to the same base composition gives vivid coloration.

In general, no substantial increase in color intensity can be accomplished by increasing either the time or temperature of the warming-in heat treatment, particularly if pure colors are desired. Increased temperatures simply increase the rate of color development and change, while increased times merely provide late-sequence colors such as green, yellow, brown, or mixtures thereof.

A particularly useful technique for providing colored glass in accordance with the invention comprises the use of a warming-in heat treatment wherein the glass is exposed to a temperature gradient to provide at least two and preferably several colors selected from the group consisting of yellow, orange, red, purple, blue, green, brown and mixtures thereof in a single glass. A temperature gradient of 10° C. across an article may be sufficient for some multiple coloration, while, a temperature gradient of 50° C. across the article may permit the development of most or all of the described colors therein. In this way a product which, for the purpose of the present description, is referred to as rainbow glass may be provided.

The invention may be further understood by reference to the following detailed example setting forth illustrative procedures for providing a colored glass article in accordance therewith.

EXAMPLE

A batch for a phase-separable borosilicate glass having a composition, in parts by weight as calculated from the batch, of about 65 parts SiO$_2$, 15 parts B$_2$O$_3$, 12 parts PbO, 6 parts Na$_2$O, 2 parts Sb$_2$O$_3$, 0.5 parts Ag and 0.16 parts Cl is compounded and melted in a crucible at 1350° C. over an interval of about 4 hours. The melt is then formed into a glass article by casting into a steel mold to form a glass slab about 4 inches by 8 inches by ⅜ inch in size.

This glass slab is placed in an annealing lehr, annealed, slowly cooled and examined. The product is a phase-separated glass which is clear and light yellow in color, having an annealing point of about 524° C.

The glass slab produced as described is subjected to a warming-in heat treatment wherein it is positioned in a gradient furnace at a location providing a temperature ranging from below 525° C. through 575° C. across the slab. After a treating interval of 60 minutes the article is removed from the furnace, cooled to room temperature and examined. The product is a rainbow glass exhibiting a sequence of colors ranging continuously from yellow at the low temperature end of the colored region to gray-green at the high temperature end.

The glass slab thus provided is analyzed for color in six different sections, numbered 1 through 6 from the low to the higher temperature regions of the sample. The transmittance curves provided by the analysis are reproduced in the appended Drawing. These curves clearly illustrate the marked differences in light transmittance and resulting color deriving from the rather small differences in temperature between the various regions of the sample.

The foregoing example is of course merely illustrative of the numerous variations in composition and treatment which may be undertaken in the course of providing colored glass articles according to the invention as hereinabove described. Nevertheless the broad utility of such glasses for a variety of technical and consumer-related applications wherein colored or multicolored glasses would be required are readily apparent.

I claim:

1. A colored glass article composed of a borosilicate glass having a composition consisting essentially, in weight percent as calculated from the batch, of about 5–21% $B_2O_3$, 35–75% $SiO_2$, 5–50% total of bivalent metal oxides selected in amounts not exceeding the indicated proportion from the group consisting of up to 50% PbO, 15% ZnO, and 5% BaO, 0.5–1.5% of a silver compound, 1–4% $Sb_2O_3$, 0–9% $Na_2O$, 0–2% F, and 0–1% $P_2O_5$, said glass comprising in at least a portion thereof a separated, glassy, boron-rich phase and a coloring metallic silver phase associated with said separated glassy, boron-rich phase, said glass article exhibiting at least one absorption color selected from the group consisting of orange, red, purple, blue, green, and mixtures thereof.

2. A glass article in accordance with claim 1 wherein the silver compound is AgCl.

3. A glass article in accordance with claim 2 wherein the bivalent metal oxide is selected from the group consisting of PbO and ZnO.

4. A glass article in accordance with claim 3 which exhibits at least two colors selected from the group consisting of orange, red, purple, blue, green, and mixtures thereof.

* * * * *